United States Patent [19]
Riedel et al.

[11] Patent Number: 5,803,613
[45] Date of Patent: Sep. 8, 1998

[54] BEARING BODY

[75] Inventors: Norbert Riedel, Rheinberg; Ludger Riedel, Xanten, both of Germany

[73] Assignee: Riedel und Sohnne oHG, Kamp-Lintfort, Germany

[21] Appl. No.: 616,808

[22] Filed: Mar. 15, 1996

[30] Foreign Application Priority Data

Mar. 17, 1995 [DE] Germany .................. 195 096 29.0

[51] Int. Cl.⁶ ................................................. F16C 11/00
[52] U.S. Cl. .......................... 384/276; 384/396; 403/258
[58] Field of Search ................................ 384/276, 295, 384/416, 396; 403/258, 260, 306, 164, 165, 156, 154, 119, 150, 270–272

[56] References Cited

U.S. PATENT DOCUMENTS 3,975,107  8/1976  Molyneux et al. ................. 403/271
5,205,667  4/1993  Montgomery, Sr. ............. 403/156 X

FOREIGN PATENT DOCUMENTS

4008619 C1  10/1991  Germany .

Primary Examiner—Thomas R. Hannon
Attorney, Agent, or Firm—Watson Cole Stevens Davis, P.L.L.C.

[57] ABSTRACT

In a bearing body for support of a tiltable section of a component, the bearing body includes a front body part (10), a rear tap (11) and a locking device (12), the part (10) and tap (11) being held by the locking device (12) in their position relative to one another.

11 Claims, 4 Drawing Sheets

BEARING BODY

BACKGROUND OF THE INVENTION

This invention relates to a bearing body which supports a tilting section on a machine component.

In supporting a tilting section at a stationary component, the tiltable section is connected to the stationary section by a cylindrical one-piece bolt and can be tilted or rotated.

A container disposal arrangement is known from DE 40 08 619 C1, involving a mobile crane with a hydraulically-activated gripper, rotatably hung at the mobile crane, which has two opposing jaws that are hydraulically movable toward one another. These jaws grip the peripheral edge of a container with claws for hoisting, tipping and lowering the container. In this known container disposal arrangement, a truck is provided with an automatic crane for hoisting, tipping and lowering of containers which are brought to the disposal site empty on the truck. There they are unloaded by the truck with the automatic crane and later loaded onto the truck filled with disposal material using the automatic crane and removed from the disposal site.

Also, on the bottom of each jaw is a claw holder tiltable about a horizontal axis and tilt-driven with a claw on each holder. Several identical containers are provided with mating engagement pockets open to the outside for the claws.

The claw holders on the bottoms of the jaws are tiltably mounted on the jaws by means of a pivot bolt and are rotatably connected from above by means of a pivot bolt, in both cases using a hydraulic cylinder. The piston of the hydraulic cylinder at the claw holder and the cylinder of the upper hydraulic cylinder are mounted to the gripper. This configuration according to DE 40 08 619 C1 is under a high degree of stress due to the existing lever arm relationships.

The object of the present invention is to provide a bearing body which operates with reduced stress as compared to the prior art devices.

SUMMARY OF THE INVENTION

This object is achieved with a bearing body that includes a front body part, a rear tap and a locking device, wherein the body part and the tap are held in their positions relative to one another by the locking device.

This journal bearing, or the bearing formed by the journal, offer the advantage of providing a bearing on both sides of the load point. It has minimal width and is self-securing.

According to a preferred feature of the invention, the locking device can consist of a fixing bolt, in particular a screw, for example, an Allen screw or a socket head screw.

According to another feature of the invention, the rear tap has inner threads fitting the outer threads of an Allen screw, a shoulder, as well as a bearing ring on the screw-head side and a cylindrical exterior surface with a region on the threaded side which is shaped like a truncated cone.

It is further advantageous that the rear tap have an inner cylindrical extension and an outer cylindrical ring as a bearing surface, as well as a shoulder for the screw head and a central drill hole for the screw bolt.

It is effective to screw the Allen screw or socket head screw into the rear tap.

Further, the cylindrical outer surface of the rear tap and the outer surface of the outer ring can align with one another.

In addition, the bearing body can be designed such that the rear tap lies with its inner extension against the shoulder of the front body part.

The rear tap should have a shoulder for the locking bolt.

The cylindrical outer surface of the front body part and the rear tap are axially distanced from one another by the inner extension of the rear tap.

A conical surface provided at the bolt end of the front body part in this bearing body is effective.

The bearing body can be used to mount a support plate for claws at the jaws of a gripper for lifting and tipping of a container as is used in a container disposal device described in DE 40 08 619 C1.

Where used, it is recommended that the bearing body be arranged such that the axis of the drill hole to seat the bearing body in a claw holder which is tiltably fastened to the component and the axis of the component be separated from one another with as much distance as possible.

The invention will be explained in more detail with the help of the accompanying drawings.

DETAILED DESCRIPTION OF THE PREFERRED EMBODIMENT

Figure 2:
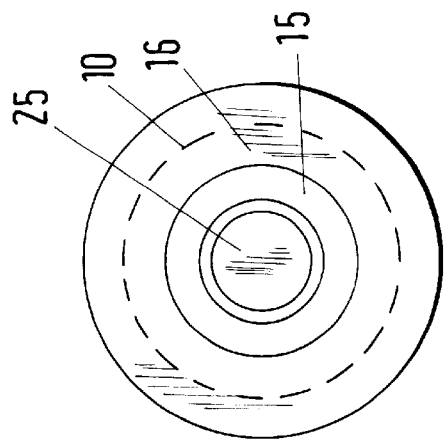
FIG. 2 is a view of FIG. 1 as seen in the direction of arrow II.
Figure 1:
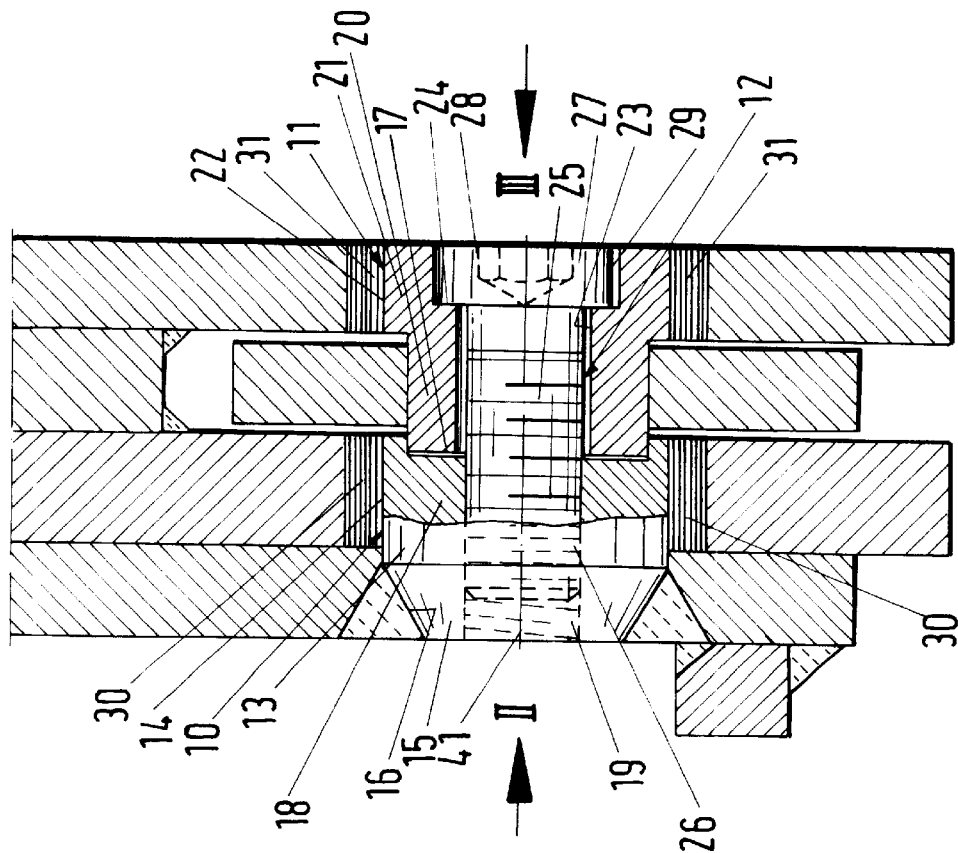
FIG. 1 is a side view of a partially sectioned bearing body according to the preferred embodiment of the present invention.
Figure 3:
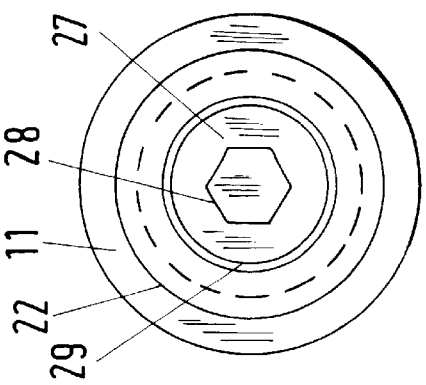
FIG. 3 is a view of FIG. 1 as seen in the direction of arrow III.

As shown in FIGS. 1—3, the bearing body consists of a front body part 10, a rear tap 11, and a locking device in the form of an Allen screw 12. The front body part 10 includes a cylindrical section 13 with a cylindrical outer surface 14 and a conical section 15 with a truncated cone surface 16. A shoulder 17 is provided on the screw-head side around which a collar 18 extends. The front body part 10 has an inner threading 19.

The rear tap 11 includes an inner extension 20 and an outer ring 21. The outer ring 21 has a cylindrical outer surface 22 which aligns with the cylindrical surface 14 of the front body part 10. The rear tap 11 has a drill hole 23 and a shoulder 24.

The Allen screw 12 includes a shank 25 with outer threads 26 and a screw head 27 with an inner hexagonal recess 28 as well as a cylindrical outer surface 29 and is screwed into the inner threads 19 of the front body part 10 with its outer threads 26. The rear tap 11 sits fastened, i.e., unable to be turned, with its inner extension 20 against the shoulder 17 of the front body part 10. The Allen screw 12 sits against the shoulder 24 of the rear tap 11 with its screw head 27.

Figure 4:
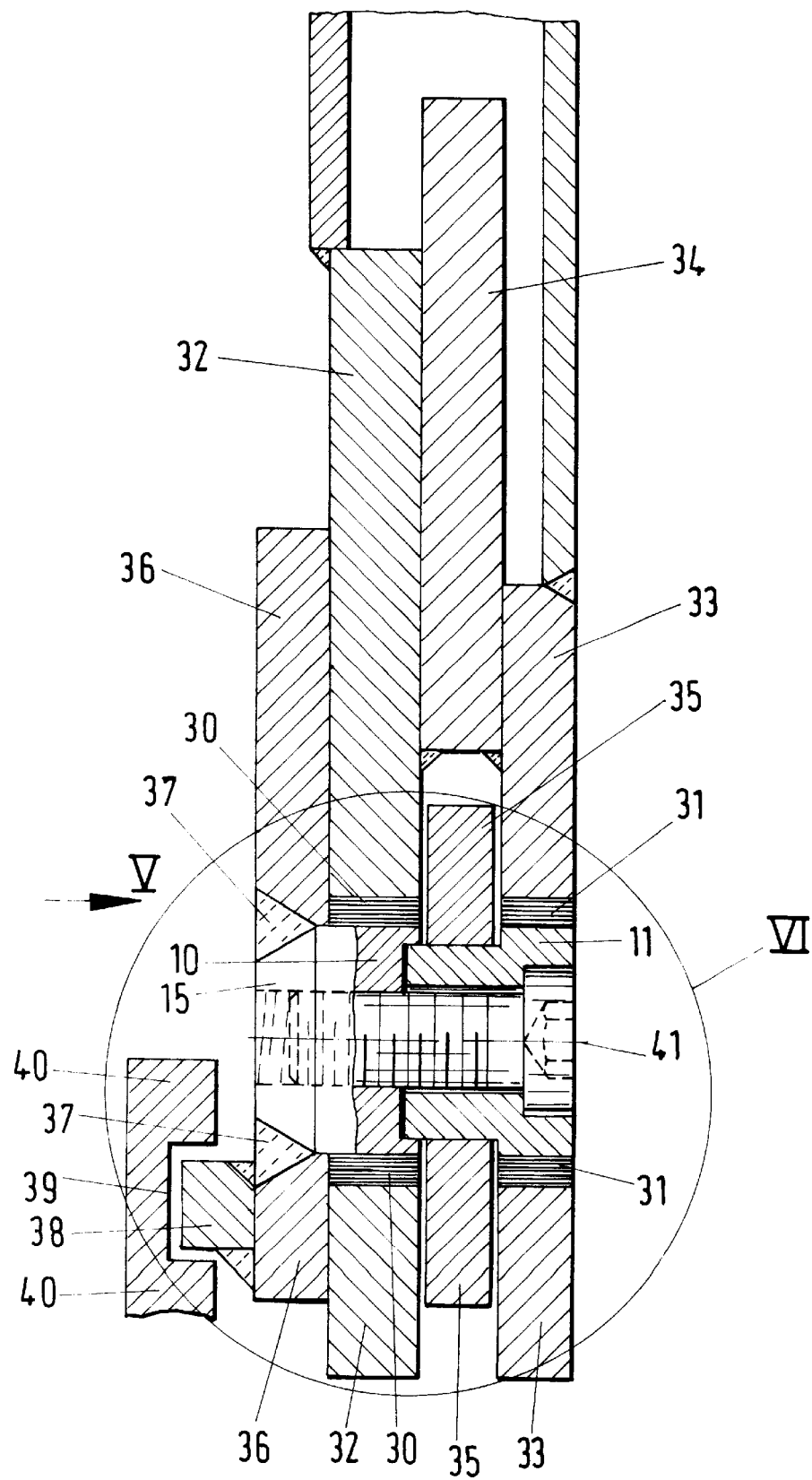
FIG. 4 is a section through a jaw and the associated claw holder as well as the bearing.

As shown particularly in FIG. 4, a bushing 30 is provided on the front body part 10 and a bushing 31 on the rear tap 11, which are bonded, or preferably glued, to two plates or sideplates 32, 33, respectively, with a distancing plate 34 arranged between them. A disc 35 is provided on the journal between the two plates or sideplates 32, 33.

A claw holder 36 is connected to the threaded side of the front body part 10 by a weld 37. At the lower end of the claw holder 36 is a claw 38, which grips a claw engagement pocket 39 of a container 40.

By effecting a rotational movement onto the claw holder 36 about the rotating axis 41, the member consisting of the sideplates 32 and 33 as well as the distancing plate 34 is rotated about the cylindrical surface 14 serving as the bearing surface.

Figure 5:
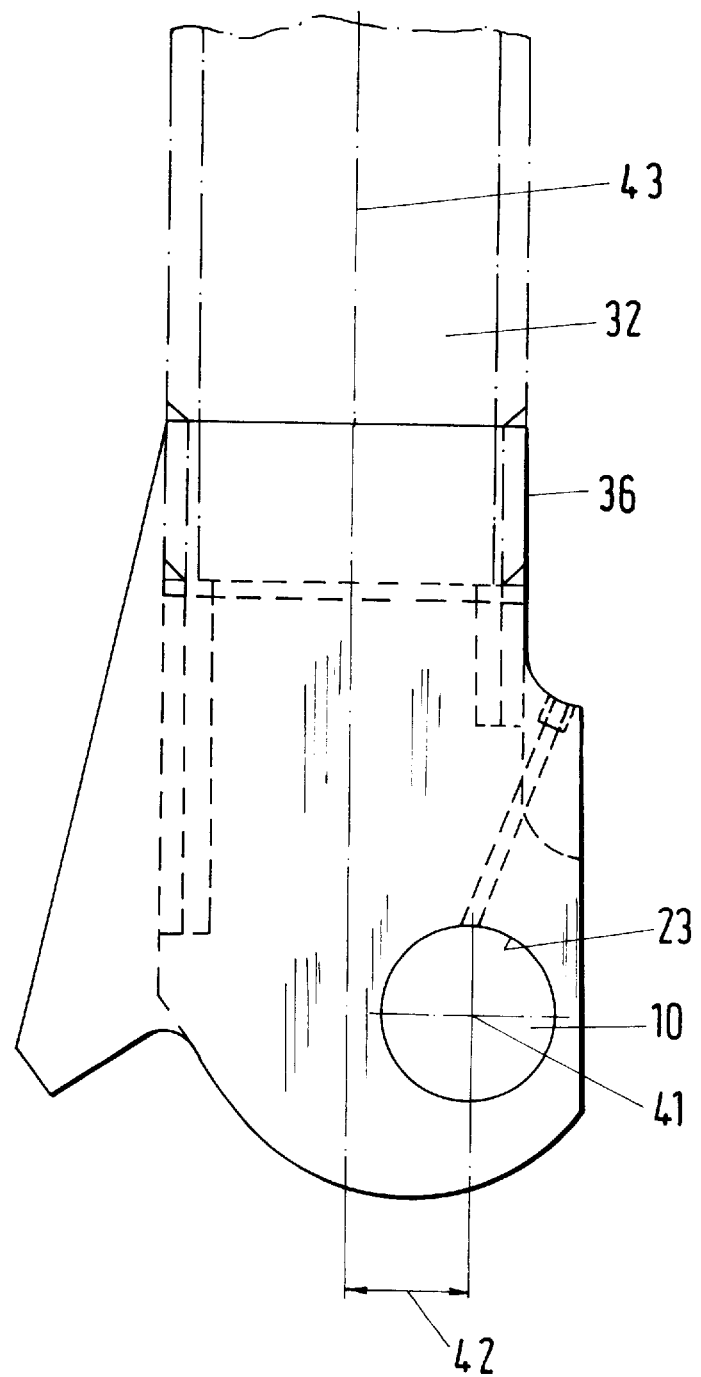
FIG. 5 is a view of FIG. 4 as seen in the direction of arrow V.
Figure 6:
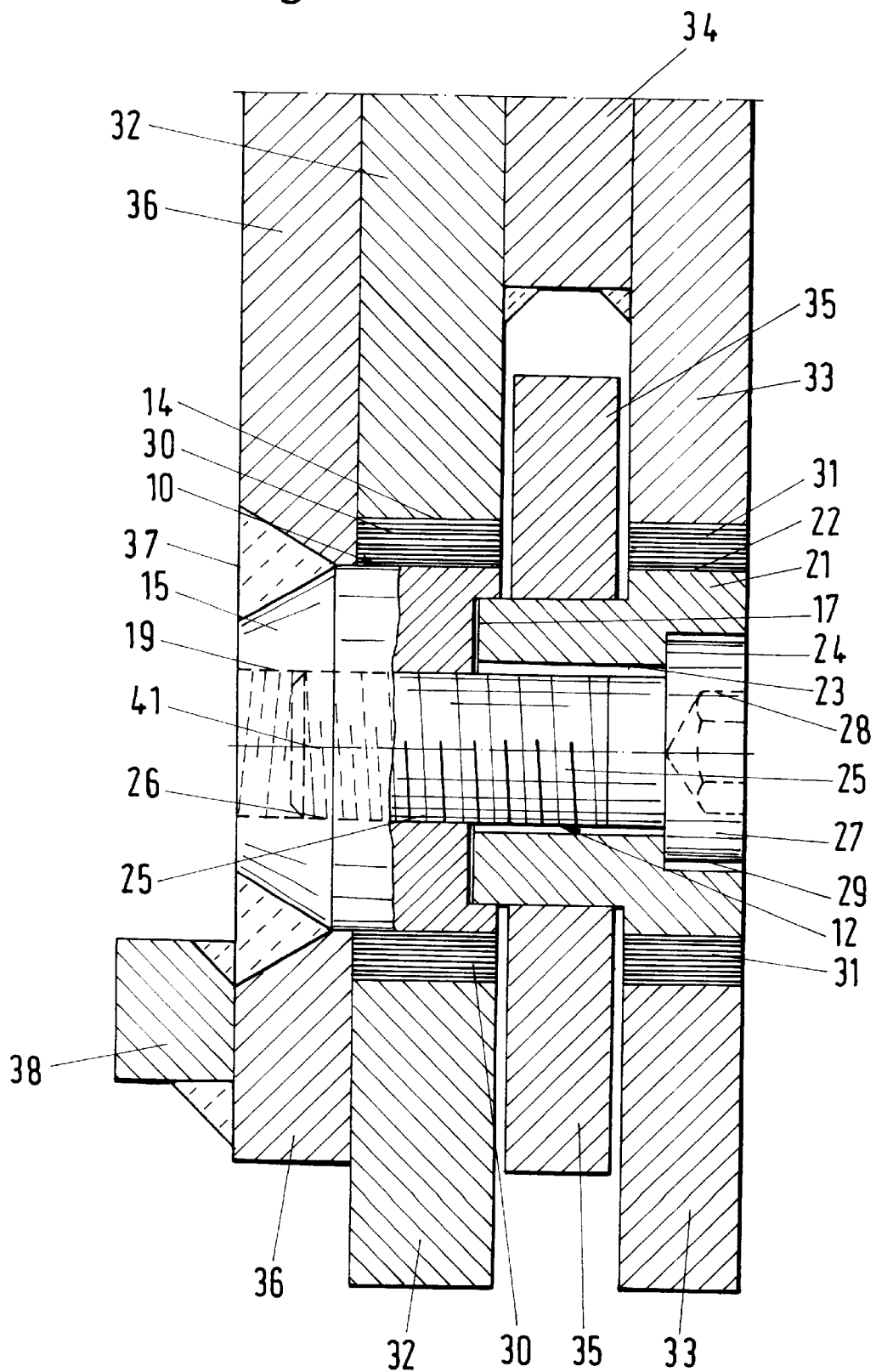
FIG. 6 is an enlarged representation of region VI of FIG. 4.

In the representation according to FIG. 5, the bearing body is left out. Axis 41 of the drill hole 23 in the claw holder 36 is separated from the longitudinal axis 43 of the sideplates 32, 33 to the largest possible degree 42. This combines the advantage that the claw holder 36 can be rotated about an angle of up to 160°, without additional linkage. With central arrangement of the drill hole 23 in the claw holder 36, i.e., at zero distance 42, this angle can be accomplished only with a linkage mechanism, for example, with an elbow lever.

We claim:

1. A combination of a swivel member for engagement with a workpiece for gripping, lifting and rotating the workpiece and a bearing unit for supporting the swivel member and for moving the swivel member along a circular arc, said bearing unit comprising:

a front axial body part which has a first end, an opposite second end, a central bore therein, and an axial outer bearing surface, said front axial body part supporting said swivel member, a rear axial tap element which has a first end, an opposite second end, a bore therethrough, and an axial outer bearing surface, a fastening means which extends through said axial bore of said rear axial tap element and into said axial bore of said front axial body part so as to abut said first end of said rear axial tap element against said second end of said front axial body part and fasten said front axial body part and said rear axial tap element together.

2. A combination according to claim 1, wherein the fastening means consists of a locking bolt.

3. A combination according to claim 1, wherein the fastening means consists of a socket head screw.

4. A combination according to claim 3, wherein the socket head screw is screwed into the rear axial tap element.

5. A combination according to claim 1, wherein the fastening means is an Allen screw, wherein the rear axial tap element has inner threads fitting outer threads of said Allen screw, a shoulder as well as an outer bearing ring, and wherein said front axial body part includes a cylindrical outer surface with a truncated cone shaped section.

6. A combination according to claim 5, wherein the cylindrical outer surface and an outer surface of the outer bearing ring of the rear axial tap element are aligned with one another.

7. A combination according to claim 6, wherein the cylindrical surface of the front axial body part and the rear axial tap element are distanced from one another by an inner extension of the rear axial tap element.

8. A combination according to claim 1, wherein the rear axial tap element has an inner cylindrical extension and an outer cylindrical ring as bearing surfaces as well as a shoulder for a screw head for a screw bolt.

9. A combination according to claim 8, wherein the rear axial tap element with the inner cylindrical extension sits against a shoulder of the front axial body part.

10. A combination according to claim 1, wherein the rear axial tap element provides a shoulder for the fastening means.

11. A combination according to claim 1, wherein the front axial body part defines a conical surface at its first end.

* * * * *